US007890687B2

(12) United States Patent
Lee et al.

(10) Patent No.: US 7,890,687 B2
(45) Date of Patent: Feb. 15, 2011

(54) MOTHERBOARD AND INTERFACE CONTROL METHOD OF MEMORY SLOT THEREOF

(75) Inventors: Ming-Jen Lee, Taipei (TW); Tung-Chang Wu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 23 days.

(21) Appl. No.: 12/507,076

(22) Filed: Jul. 22, 2009

(65) Prior Publication Data
US 2010/0042769 A1  Feb. 18, 2010

(30) Foreign Application Priority Data
Aug. 14, 2008 (TW) .............................. 97130978 A (51) Int. Cl.
H05K 7/10 (2006.01)
G06F 12/06 (2006.01)
G06F 13/00 (2006.01)
G06F 9/34 (2006.01)

(52) U.S. Cl. ........................... 710/301; 710/302; 711/5; 711/170; 711/173; 711/202; 711/211

(58) Field of Classification Search .................. 710/301, 710/302; 711/5, 170, 173, 202, 211; 365/230.01
See application file for complete search history.

(56) References Cited
U.S. PATENT DOCUMENTS 5,175,839 A * 12/1992 Ikeda et al. .................. 711/200
5,278,967 A * 1/1994 Curran ........................... 711/5
5,341,484 A * 8/1994 Tanaka et al. ................ 718/100
5,369,750 A * 11/1994 Inoue et al. .................. 718/100
5,394,537 A * 2/1995 Courts et al. ................. 711/202
5,420,995 A * 5/1995 Taguri ......................... 711/211
5,524,228 A * 6/1996 Maruyama et al. .......... 711/220
5,535,368 A * 7/1996 Ho et al. ...................... 711/170
5,771,369 A * 6/1998 Curran ........................ 711/105
6,170,035 B1 * 1/2001 Gianellini et al. .............. 711/5
6,173,383 B1 * 1/2001 Casamatta ................... 711/202
6,334,175 B1 * 12/2001 Chih ........................... 711/170
6,473,845 B1 * 10/2002 Hornung et al. ............. 711/165
6,792,499 B1 * 9/2004 Eldredge ........................ 711/5
7,281,113 B2  10/2007 Fujita et al.
2003/0172245 A1 * 9/2003 Takala ......................... 711/220

FOREIGN PATENT DOCUMENTS
CN          1460931        12/2003

* cited by examiner

*Primary Examiner*—Mark Rinehart
*Assistant Examiner*—Jeremy S Cerullo
(74) *Attorney, Agent, or Firm*—Jianq Chyun IP Office (57) ABSTRACT

The invention provides a motherboard and an interface control method of a memory slot thereof. The motherboard includes a plurality of slot groups, a bus, and an interface controller. Each of the slot groups includes a first memory slot and a second memory slot connected with the bus. The first memory slot and the second memory slot form two different access addresses. The interface controller transmits a plurality of pin control signals to the corresponding slot groups to make the two access addresses of the first memory slot and the second memory slot of a using slot group of the slot groups different from the two access addresses of the first memory slot and the second memory slot of each of the other slot groups. Then, the interface controller accesses the using slot group via the bus.

20 Claims, 6 Drawing Sheets

FIG. 1 (PRIOR ART)

| SA2 | SA1 | SA0 | access address |
|---|---|---|---|
| 0 | 0 | 0 | A0h |
| 0 | 0 | 1 | A2h |
| 0 | 1 | 0 | A4h |
| 0 | 1 | 1 | A6h |
| 1 | 0 | 0 | A8h |
| 1 | 0 | 1 | AAh |
| 1 | 1 | 0 | ACh |
| 1 | 1 | 1 | AEh |

| TM1(3) | TM1(2) | TM1(1) | access address |
|---|---|---|---|
| 0 | 0 | 0 | A0h |
| 0 | 0 | 1 | A2h |
| 0 | 1 | 0 | A4h |
| 0 | 1 | 1 | A6h |

| TM2(3) | TM2(2) | TM2(1) | access address |
|---|---|---|---|
| 0 | 0 | 0 | A0h |
| 0 | 0 | 1 | A2h |
| 0 | 1 | 0 | A4h |
| 0 | 1 | 1 | A6h |

MOTHERBOARD AND INTERFACE CONTROL METHOD OF MEMORY SLOT THEREOF

CROSS-REFERENCE TO RELATED APPLICATION

This application claims the priority benefit of Taiwan application serial no. 97130978, filed on Aug. 14, 2008. The entirety of the above-mentioned patent application is hereby incorporated by reference herein and made a part of specification.

BACKGROUND OF THE INVENTION

1. Field of the Invention

The invention relates to a motherboard and, more particularly, to a motherboard which can effectively utilize a memory module.

2. Description of the Related Art

A personal computer system is mainly composed of a motherboard, an interface card, and a peripheral device. The motherboard acts as a heart of the personal computer system. The motherboard not only has a central processing unit (CPU), a control chip set, and a slot where an interface card may be assembled, but also has some memory slots where memory modules may be assembled. One memory module is composed of several memory elements. The number of the memory modules assembled on the motherboard may be various according to a demand of a user.

Figure 1:
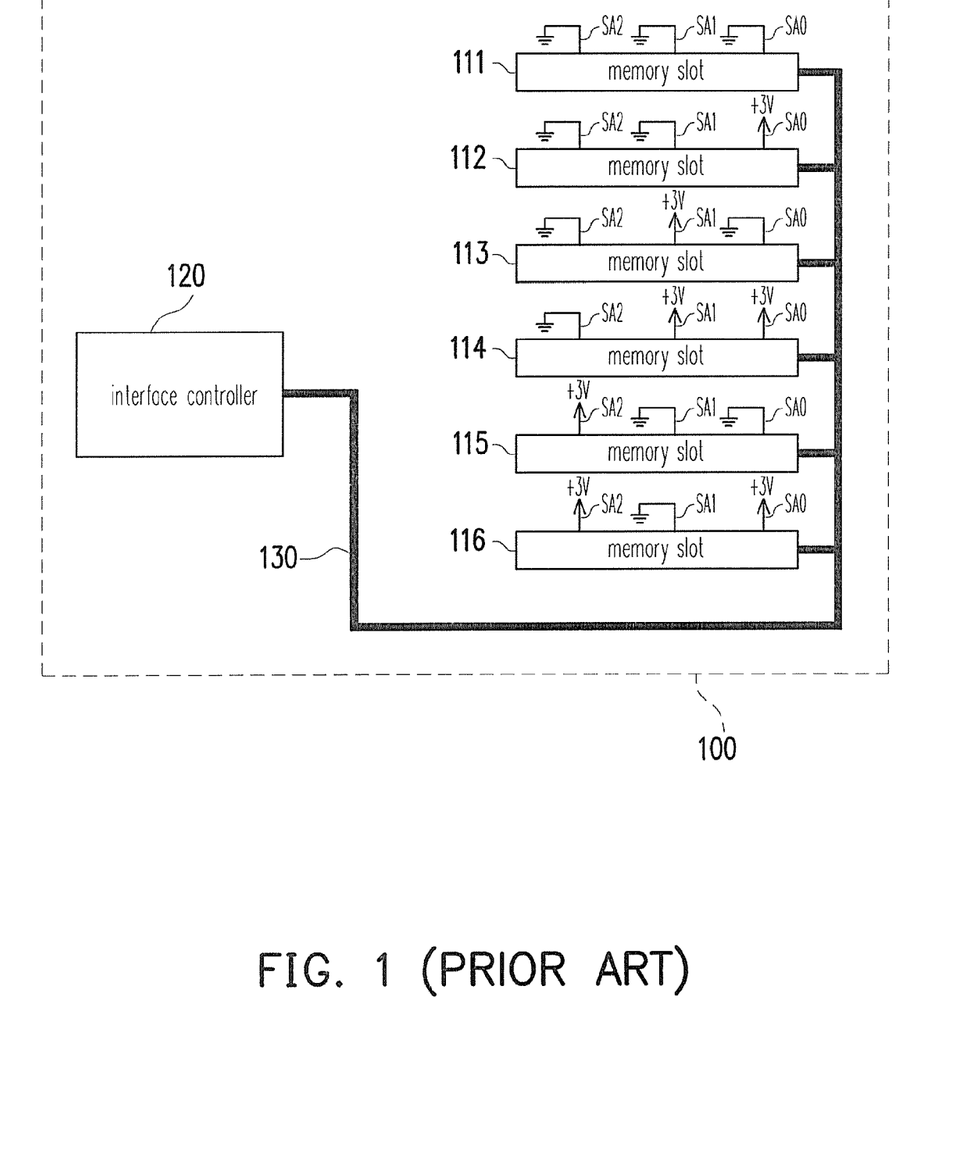
FIG. 1 is a schematic diagram showing some elements of a conventional motherboard.
Figure 2:
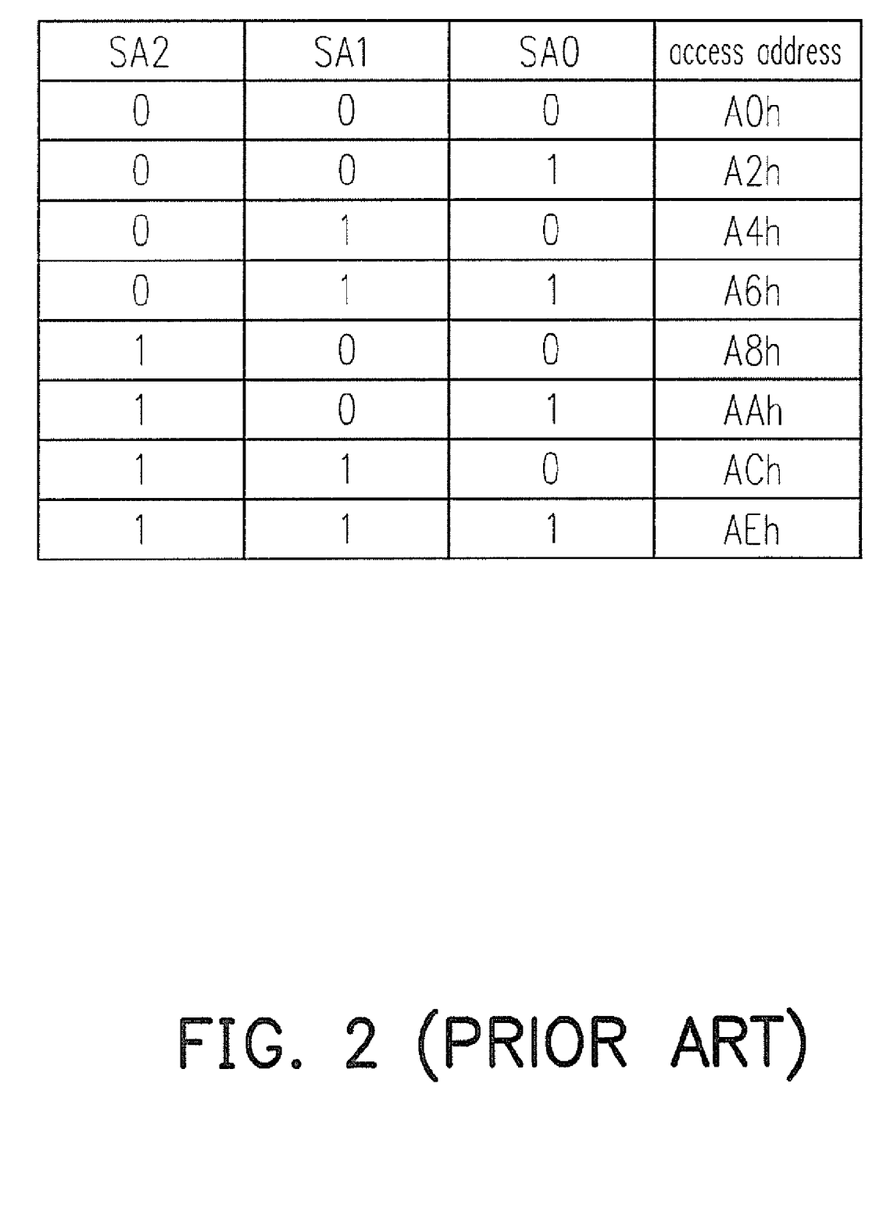
FIG. 2 is a comparison table used for illustrating logic levels of connection pins and access addresses in FIG. 1.

FIG. 1 is a schematic diagram showing some elements of a conventional motherboard. A conventional motherboard 100 includes memory slots 111 to 116, an interface controller 120, and a system management bus 130. The memory slots 111 to 116 are used for allowing the memory modules (not shown) to be inserted in. Additionally, each of the memory slots 111 to 116 has three connection pins SA0 to SA2. Logic levels of the connection pins SA0 to SA2 correspond to access addresses of the system management bus 130 as shown in FIG. 2.

For example, when logic levels of the connection pins SA0 to SA2 is 000, the access address of the system management bus 130 is A0$h$. As a result, when the interface controller 120 wants to access the memory module inserted in the memory slot 111, the interface controller 120 reads corresponding data such as serial presence detect (SPD) data according to the access address A0$h$ of the system management bus 130.

The access addresses of the system management bus 130 cannot be repeated. Consequently, the logic levels of the connection pins SA0 to SA2 of the memory slots 111 to 116 of the conventional motherboard 100 are different from each other. However, the SPD of some memory modules in the market only supports four addresses A0$h$, A2$h$, A4$h$, and A6$h$. That is, the connection pins SA2 of the memory slots 111 to 116 must be electrically connected with ground voltage to meet the four addresses A0$h$, A2$h$, A4$h$, and A6$h$ supported by the memory module. As a result, when more than four memory modules are inserted in the memory slots 111 to 116 of the conventional motherboard 100, the access addresses of the system management bus 130 are repeated. Thus, the personal computer system cannot be booted normally.

Therefore, a warning light is utilized to timely remind the user that the number of this type of the memory modules inserted in the common motherboard cannot exceed four. However, in this mode, the number of this type of the memory modules inserted in the motherboard is at most four, and the memory slots of the common motherboard cannot be fully utilized. Another method is illustrated accompanying FIG. 3.

Figure 3:
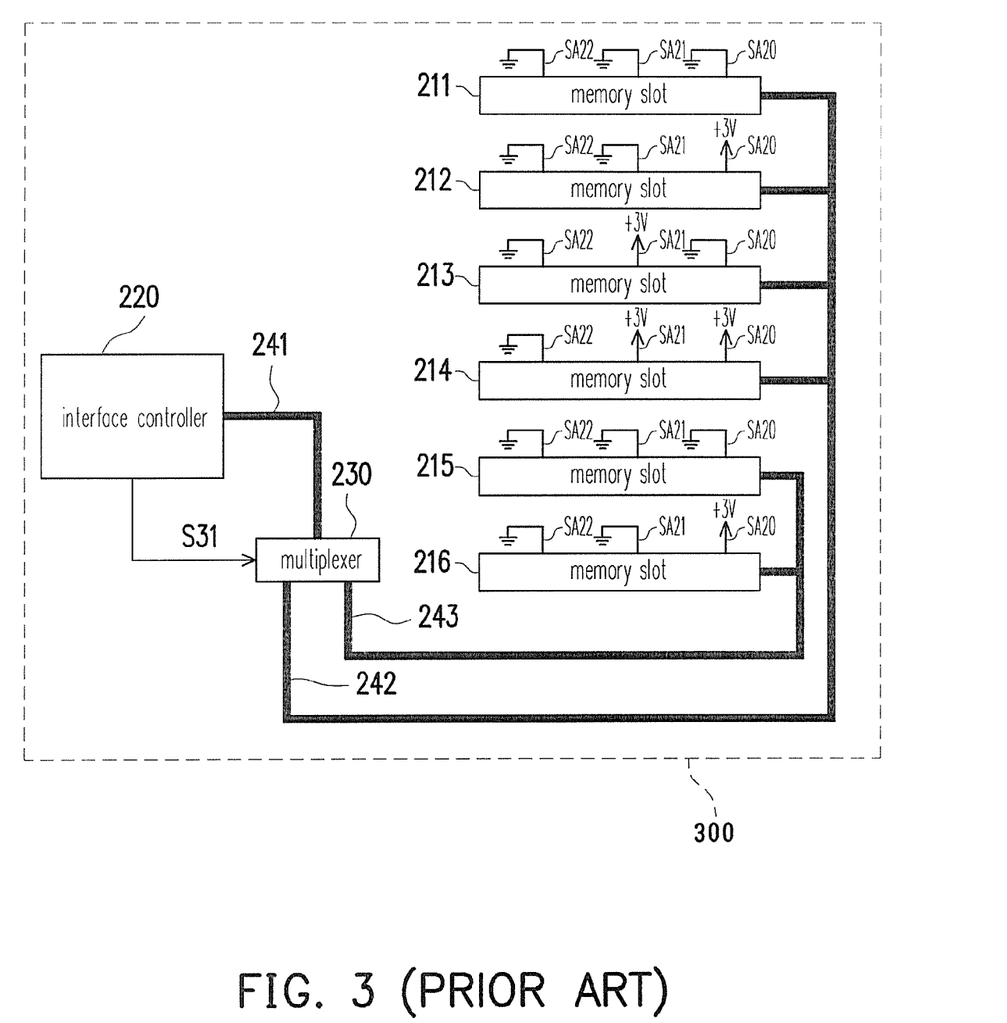
FIG. 3 is a block diagram showing another conventional motherboard.

A conventional motherboard 300 includes memory slots 211 to 216, an interface controller 220, a multiplexer 230, and system management buses 241 to 243.

As shown in FIG. 2 and FIG. 3, all connection pins SA20 to SA22 of the memory slots 211 to 216 of the conventional motherboard 300 are maintained at the logic levels corresponding to the access addresses A0$h$, A2$h$, A4$h$, and A6$h$. The logic levels of the connection pins SA20 to SA22 of the memory slots 211 and 212 are the same as those of the connection pins SA20 to SA22 of the memory slots 215 and 216, respectively.

To avoid that the access addresses of the system management bus 130 are repeated, the memory slots 211 to 214 are electrically connected with the system management bus 242, and the memory slots 215 and 216 are electrically connected with the system management bus 243. As a result, when the interface controller 220 accesses data from the memory slots 211 to 216 one by one via the system management bus 241, it transmits a control signal S31 to make the multiplexer 230 timely switch the system management bus 241 to the system management bus 242 or 243.

In other words, a multiplexer is additionally added to the conventional motherboard 300 to fully utilize the memory slots. At the time, the hardware cost of the conventional motherboard 300 is increased along with the addition of the multiplexer.

BRIEF SUMMARY OF THE INVENTION

The invention provides a motherboard and an interface control method of a memory slot thereof to overcome disadvantages of conventional technology and make an interface controller utilize a bus whose access addresses are unrepeated to access data from the read slot group.

The invention provides a motherboard includes a plurality of slot groups, a bus and an interface controller. Each of the slot groups includes a first memory slot and a second memory slot. The first memory slot has a plurality of first connection pins. The second memory slot has a plurality of second connection pins. A second input pin of the second connection pins and a first input pin of the first connection pins receive a first voltage and a second voltage with different levels, respectively, to make the first memory slot and the second memory slot form two different access addresses.

The bus is connected with the first memory slots and the second memory slots of the slot groups. Additionally, the interface controller transmits a plurality of pin control signals to the corresponding slot groups to make the two access addresses of the first memory slot and the second memory slot of a using slot group of the slot groups different from the two access addresses of the first memory slot and the second memory slot of each of the other slot groups. Then, the interface controller accesses the using slot group via the bus.

The motherboard further includes an expansion slot group. The expansion slot group includes a third memory slot and a fourth memory slot having a fifth input pin and a sixth input pin. The fifth input pin and the sixth input pin receive the first voltage and the second voltage with different levels, respectively, to make the third memory slot and the fourth memory slot form the two different access addresses. The third memory slot and the fourth memory slot are not controlled by any of the pin control signals.

The invention further provides an interface control method of a memory slot adapted for a motherboard including a plurality of slot groups, a bus, and an interface controller. Each of the slot groups includes a first memory slot and a second memory slot electrically connected with the bus, respectively. Additionally, the first memory slot has a plurality of first connection pins, and the second memory slot has a plurality of second connection pins.

As stated above, the interface control method of the memory slot includes the following steps. First, a first voltage and a second voltage with different levels are received via a second input pin of the second connection pins and a first input pin of the first connection pins, respectively, to form two different access addresses. Second, a plurality of pin control signals are transmitted to the corresponding slot groups via the interface controller to male the two access addresses of the first memory slot and the second memory slot of a using slot group of the slot groups different from those of the first memory slot and the second memory slot of each of the other slot groups. Finally, the using slot group is accessed via the interface controller.

According to the invention, two access addresses of the first memory slot and the second memory slot of a using slot group needs to be made different from those of the first memory slots and the second memory slots of the other slot groups via the interface controller, and then the interface controller can access the using slot group. As a result, all memory slots on the motherboard can be fully utilized, and it can avoid failing to read due to repeated addresses. Furthermore, the multiplexer is omitted to consider the hardware cost of the motherboard.

These and other features, aspects and advantages of the present invention will become better understood with regard to the following description, appended claims, and accompanying drawings.

DETAILED DESCRIPTION OF THE EMBODIMENTS

Figure 4:
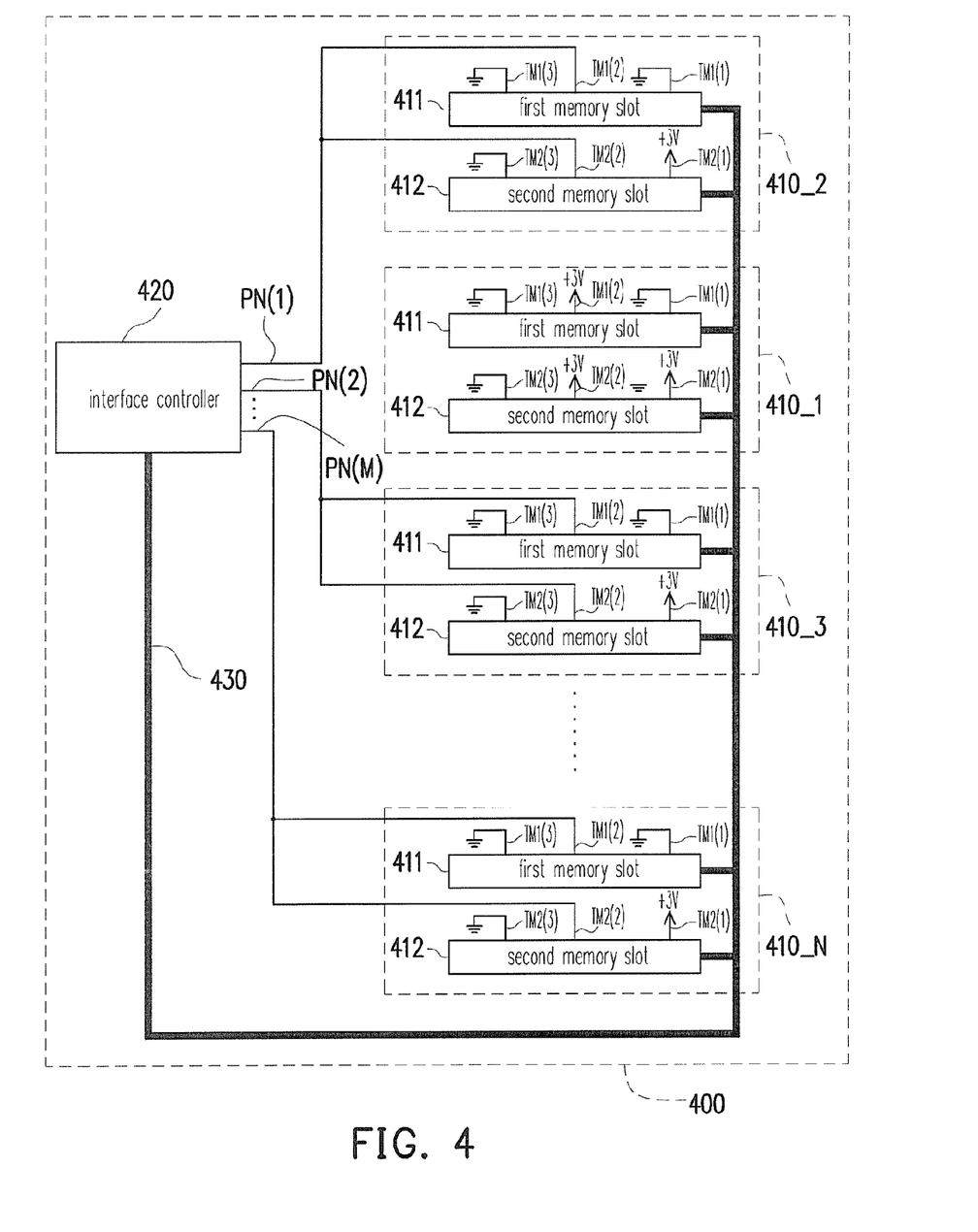
FIG. 4 is a schematic diagram showing some elements of a motherboard according to an embodiment of the invention.

FIG. 4 is a schematic diagram showing some elements of a motherboard according to an embodiment of the invention. A motherboard 400 includes a plurality of slot groups 410_1 to 410_N, an interface controller 420, and a bus 430. Each of the slot groups 410_1 to 410_N includes a first memory slot 411 and a second memory slot 412. The first memory slot 411 and the second memory slots 412 have a plurality of connection pins, respectively. The first memory slots 411 and the second memory slots 412 having three connection pins, respectively, are taken as an example hereafter to illustrate the invention.

In this embodiment, the first memory slot 411 has three connection pins TM1(1) to TM1(3). The second memory slot 412 has three connection pins TM2(1) to TM2(3). In other words, each of the slot groups 410_1 to 410_N corresponds to the six connection pins TM1(1) to TM1(3) and TM2(1) to TM2(3). In the overall configuration, the first memory slots 411 and the second memory slots 412 of the slot groups 410_1 to 410_N are electrically connected with the bus 430.

Figure 5:
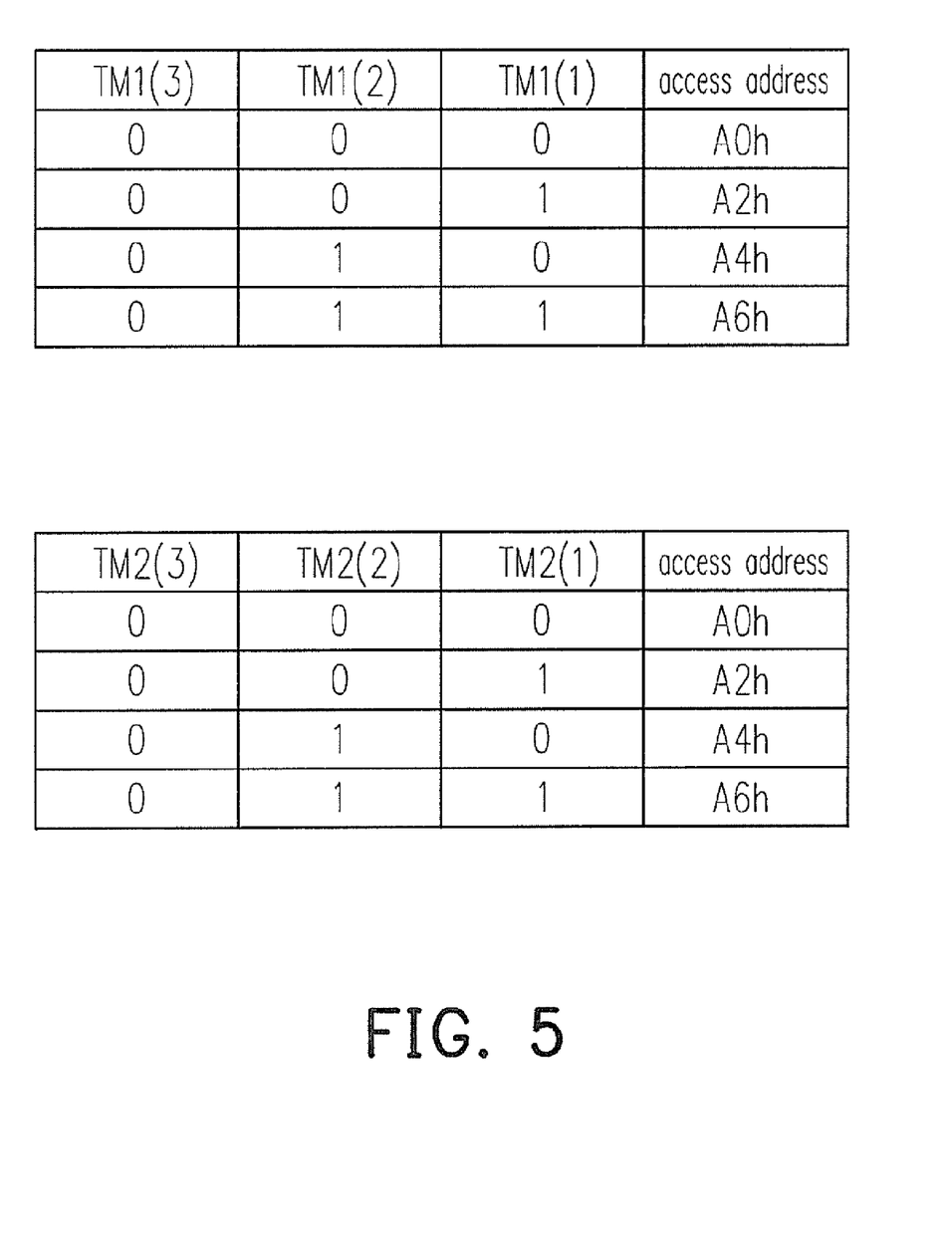
FIG. 5 is a comparison table used for illustrating logic levels of connection pins and access addresses in FIG. 4.

Most significant bit (MSB) connection pins of some memory modules in the market are designed to be connected with a first voltage (ground voltage 0V). The connection pins TM1(3) and TM2(3) of the memory slots are fixed at 0 V (connected with ground) which can be seen from a connection state in FIG. 4 and a table in FIG. 5. Furthermore, the connection pins TM1(1) and TM1(3) of the first memory slots 411 of the slot groups 410_1 to 410_N are electrically connected with the first voltage (such as 0V). The connection pins TM2(1) and TM2(3) of the second memory slots 412 of the slot groups 410_1 to 410_N are electrically connected with a second voltage (such as +3V) and the first voltage, respectively. Moreover, the connection pins TM1(2) and TM2(2) corresponding to the slot groups 410_1 are electrically connected with the second voltage. The bus 430 may be a system management bus in this embodiment.

Digital signals are supposed to include a first logic level and a second logic level such as logical zero and logical one in this embodiment. The first logic level (logical zero) corresponds to the first voltage (0V), and the second logic level (logical one) corresponds to the second voltage (+3V). As a result, in this embodiment, the connection pins TM1(1) and TM1(3) corresponding to the slot groups 410_1 to 410_N are maintained at the same logic level, and the connection pins TM2(1) and TM2(3) corresponding to the slot groups 410_1 to 410_N are maintained at different logic levels.

In other words, the connection pin TM1(1) of the first memory slot 411 and the connection pin TM2(1) of the second memory slot 412 receive the first voltage and the second voltage with different levels, respectively. Therefore, when the connection pin TM1(2) of the first memory slot 411 and the connection pin TM2(2) of the second memory slot 412 are maintained at the same logic level, the first memory slot 411 and the second memory slot 412 may form two different access addresses.

On the other hand, the interface controller 420 has a plurality of pins PN(1) to PN(M) to output a plurality of pin control signals, respectively. The pin PN(1) is electrically connected with the connection pin TM1(2) of the first memory slot 411 and the connection pin TM2(2) of the second memory slot 412 of the slot groups 410_2. Similarly, the pin PN(2) is electrically connected with the connection pin TM1(2) of the first memory slot 411 and the connection pin TM2(2) of the second memory slot 412 of the slot group 410_3. One pin control signal may be designed to be omitted due to a cost consideration. As a result, a group of the slot group 410_1 may be designed to have two constant access addresses and uncontrolled by the pin control signal as shown in FIG. 4. The interface controller 420 generates the pin control signals basing on the two constant access addresses of the first memory slot 411 and the second memory slot 412 of the slot group 410_1 and cooperation of access actions.

Similarly, a j-th pin PN(j) of the interface controller 420 is electrically connected with the connection pins TM1(2) and TM2(2) of a (j+1)-th slot group 410_j+1. The number j is an integer larger than or equal to one and smaller than or equal to N−1. Additionally, the interface controller 420 is also electrically connected with the bus 430. The pins PN(1) to PN(M) of the interface controller 420 may be general-purpose input/output ports of the interface controller 420 in this embodiment.

As shown in FIG. 4, the first memory slots 411 and the second memory slots 412 of the slot groups 410_1 to 410_N are used for allowing the memory module (not shown) to be inserted in. The interface controller 420 accesses the data such as SPD data in the memory module inserted in the first memory slots 411 and the second memory slots 412 via the bus 430. The access address of the bus 430 is determined by the connection pins TM1(1) to TM1(3) of the first memory slots 411 or the connection pins TM2(1) to TM2(3) of the second memory slots 412.

For example, when the interface controller 420 accesses the data from the first memory slot 411 via the bus 430, the access address of the bus 430 is determined by the logic level of the connection pins TM1(1) to TM1(3). Similarly, when the interface controller 420 accesses the data from the second memory slot 412 via the bus 430, the access address of the bus 430 is determined by the logic level of the connection pins TM2(1) to TM2(3).

When the interface controller 420 reads the data from the slot groups 410_1 to 410_N via the bus 430 one by one, the interface controller 420 transmits the pin control signals via the pins PN(1) to PN(M) to set the logic levels of the corresponding connection pins TM1(2) and TM2(2) of the slot groups 410_2 to 410_N.

For example, when the interface controller 420 wants to read the data from the slot group 410_1, that is, when the slot group 410_1 is a using slot group, the interface controller 420 sets the corresponding connection pins TM1(2) and TM2(2) of the slot groups 410_2 to 410_N to be at the first voltage (0V) via the pin control signals transmitted via the pins PN(1) to PN(M), and the first voltage is the first logic level (logical zero). At the time, the logic levels of the connection pins TM1(1) to TM1(3) of the first memory slots 411 of unread slot groups 410_2 to 410_N are the same. Similarly, the logic levels of the connection pins TM2(1) to TM2(3) of the second memory slots 412 of the unread slot groups 410_2 to 410_N are also the same. In other words, the first memory slots 411 and the second memory slots 412 of the unread slot groups 410_2 to 410_N form the two access addresses A0$h$ and A2$h$.

Additionally, the first memory slot 411 and the second memory slot 412 of the read slot group 410_1 form two access addresses A4$h$ and A6$h$. The two access addresses A4$h$ and A6$h$ formed by the read slot group 410_1 are different from the two access addresses A0$h$ and A2$h$ formed by the first memory slots 411 and the second memory slots 412 of the unread slot groups 410_2 to 410_N. As a result, the interface controller 420 may read the data from the first memory slot 411 and the second memory slot 412 of the slot group 410_1 one by one or alternatively via the bus 430.

On the other hand, when the interface controller 420 wants to read the data from the slot group 410_2, that is, when the slot group 410_2 is the using slot group, the interface controller 420 sets the logical levels of the corresponding connection pins TM1(2) and TM2(2) of the slot group 410_2 to be at the first voltage (0V), and sets the corresponding connection pins TM1(2) and TM2(2) of the slot groups 410_3 to 410_N to be at the second voltage (+3V) via the pin control signals transmitted via the pins PN(1) to PN(M). The first voltage (0V) is the first logic level (logical zero), and the second voltage (+3V) is the second logic level (logical one).

At the time, the two access addresses A4$h$ and A6$h$ are formed by the first memory slots 411 and the second memory slots 412 of the unread slot groups 410_1 and 410_3 to 410_N. Additionally, two access addresses A0$h$ and A2$h$ are formed by the first memory slot 411 and the second memory slot 412 of the read slot group 410_2. As a result, the interface controller 420 can read the data from the first memory slot 411 and the second memory slot 412 of the slot group 410_2 one by one or alternatively.

Above all, since all the corresponding connection pins TM1(1), TM1(3), TM2(1), and TM2(3) of the slot groups 410_1 to 410_N are maintained at a specific logic level, respectively. Consequently, the interface controller 420 only needs to set the connection pins TM1(2) and TM2(2) of the read slot groups and the connection pins TM1(2) and TM2(2) of unread slot groups to be at different logic levels, and then the logic levels of the corresponding connection pins TM1(1) to TM1(3) and TM2(1) to TM2(3) of the read slot groups are not repeated.

Additionally, in the process of setting the corresponding connection pins TM1(2) and TM2(2) of the slot groups 410_1 to 410_N, the corresponding connection pins TM1(2) and TM2(2) of the slot group 410_1 are first maintained at the same logic level (such as logical one) in this embodiment. That is, the slot group 410_1 is regarded as an expansion slot group. At the time, the two constant access addresses A4$h$ and A6$h$ are formed by the first memory slot 411 and the second memory slot 412 of the slot group 410_1. Then, the interface controller 420 generates the pin control signals basing on the two constant access addresses A4$h$ and A6$h$ of the slot group 410_1 and cooperation of the access actions of the slot groups 410_1 to 410_N.

As a result, the interface controller 420 may set the corresponding connection pins TM1(2) and TM2(2) of the slot groups 410_2 to 410_N via the pin control signals to make the two access addresses of the first memory slot and the second memory slot of the read slot group (the using slot group) different from the two access addresses of the first memory slot and the second memory slot of each of the other slot groups. A mode of setting the connection pins TM1(2) and TM2(2) of the memory slots is provided in this embodiment, but not used for limiting the invention.

The corresponding connection pin TM1(3) and TM2(3) of the slot groups 410_1 to 410_N of a motherboard with a present specification are designed to be maintained at the same logic level (such as the logical zero). Therefore, a plurality of the memory modules whose SPD only supports the four addresses A0$h$, A2$h$, A4$h$, and A6$h$ can be inserted in the slot groups 410_1 to 410_N, respectively, without increasing the hardware cost according to this embodiment of the invention. In other words, to the memory module whose SPD only supports the four addresses A0$h$, A2$h$, A4$h$, and A6$h$, not only the memory slots of the motherboard 400 can be fully utilized, but also the hardware cost of the motherboard 400 may be considered at the same time according to the invention.

Figure 6:
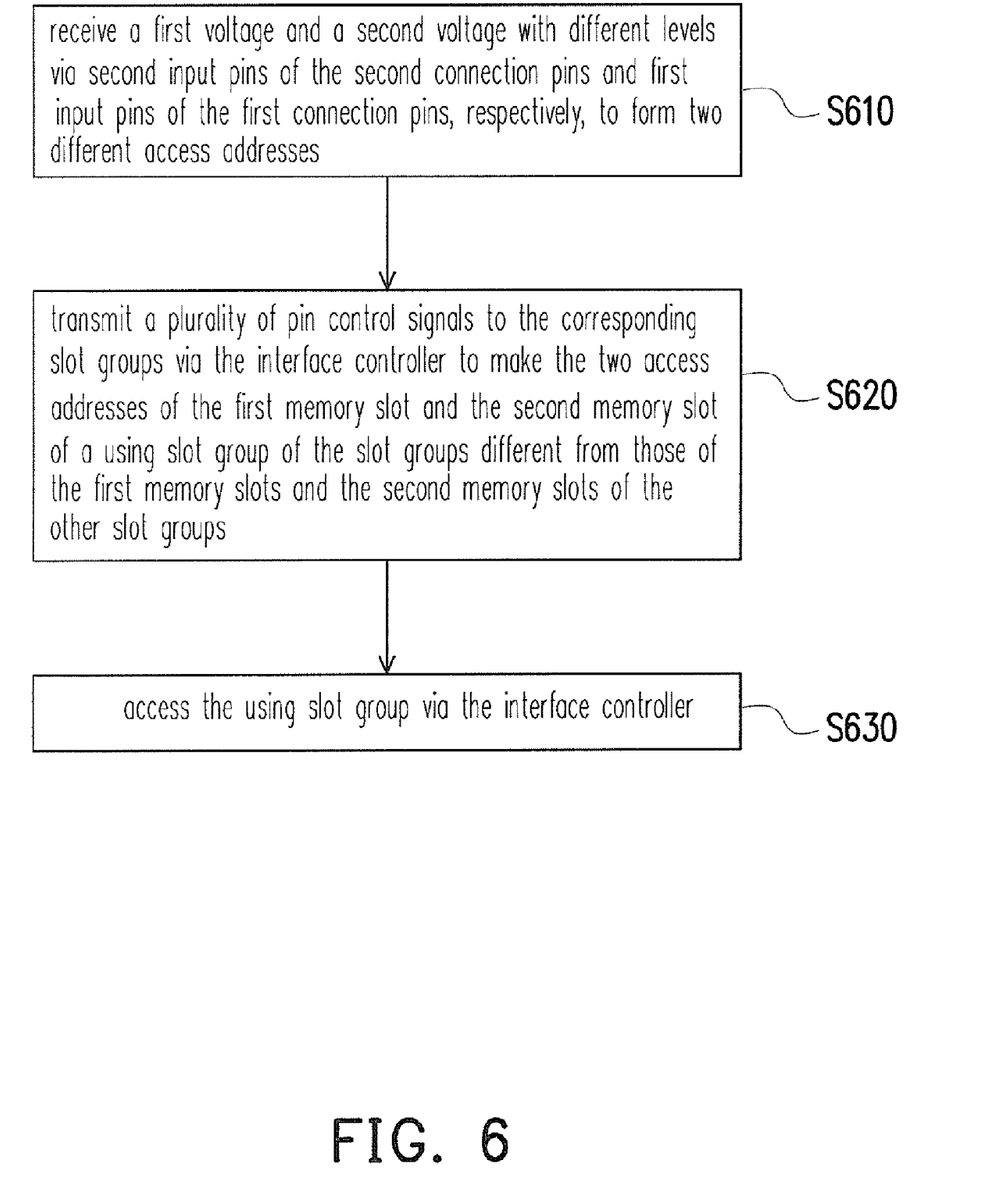
FIG. 6 is a flow chart showing an interface control method of a memory slot according to an embodiment of the invention.

An interface control method of a memory slot can also induced from the above embodiment. FIG. 6 is a flow chart showing the interface control method of the memory slot according to an embodiment of the invention. The interface control method of the memory slot is adapted for a motherboard including a plurality of slot groups, a bus, and an interface controller. Each of the slot groups include includes a first memory slot and a second memory slot electrically connected with the bus, respectively. Additionally, the first memory slot has a plurality of first connection pins, and the second memory slot has a plurality of second connection pins.

As shown in FIG. 6, at step S610, a first voltage and a second voltage with different levels are received via second input pin of the second connection pins and first input pin of the first connection pins, respectively, to form two different access addresses. Then, at step S620, a plurality of pin control signals are transmitted to the corresponding slot groups via the interface controller to make the two access addresses of the first memory slot and the second memory slot of a using slot group of the slot groups different from those of the first memory slots and the second memory slots of the other slot groups. Finally, at step S630, the using slot group is accessed via the interface controller. Other details of the interface control method of the memory slot in this embodiment can be obtained from the above illustration in the above embodiment, and they are not described here for a concise purpose.

As stated above, the corresponding connection pins TM1(1), TM1(3), TM2(1), and TM2(3) of each of the slot groups are first maintained at a specific logic level. Then, the connection pins TM1(2) and TM2(2) of the read slot groups and the connection pins TM1(2) and TM2(2) of unread slot groups are set to be at different logic levels via the interface controller. As a result, the logic levels of the connection pins TM1(1) to TM1(3) and TM2(1) to TM2(3) of the read slot group are not repeated to each other. Thus, the interface controller may utilize the bus whose access addresses are not repeated to access the data of the read slot groups.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A motherboard, comprising:
   a plurality of slot groups each of which includes a first memory slot and a second memory slot, wherein the first memory slot has a plurality of first connection pins, the second memory slot has a plurality of second connection pins, and a second input pin of the second connection pins and a first input pin of the first connection pins receive a first voltage and a second voltage with different levels, respectively, to make the first memory slot and the second memory slot form two different access addresses;
   a bus connected with the first memory slot and the second memory slot of each of the slot groups; and
   an interface controller transmitting a plurality of pin control signals to the corresponding slot groups to make the two access addresses of the first memory slot and the second memory slot of a using slot group of the slot groups different from the two access addresses of the first memory slot and the second memory slot of each of the other slot groups, wherein the interface controller accesses the using slot group via the bus.

2. The motherboard according to claim 1, wherein each of the first memory slot and the second memory slot has three connection pins.

3. The motherboard according to claim 1, wherein the first voltage corresponds to logical zero, and the second voltage corresponds to logical one.

4. The motherboard according to claim 1, wherein the first voltage corresponds to logical one, and the second voltage corresponds to logical zero.

5. The motherboard according to claim 1, wherein the first input pin is the least significant bit (LSB) connection pin of the first connection pins, and the second input pin is the least significant bit connection pin of the second connection pins.

6. The motherboard according to claim 5, wherein the most significant bit (MSB) connection pins of the first connection pins and the second connection pins are connected with ground voltage, respectively.

7. The motherboard according to claim 1, wherein the pin control signals are outputted via a plurality of general-purpose input/output ports of the interface controller.

8. The motherboard according to claim 1, wherein the pin control signals are outputted to a third input pin of the first connection pins and a fourth input pin of the second connection pins.

9. The motherboard according to claim 1, wherein the number of the pin control signals is the same as the number of the slot groups.

10. The motherboard according to claim 1, wherein the motherboard further comprises an expansion slot group including a third memory slot and a fourth memory slot, the third memory slot and the fourth memory slot have a fifth input pin and a sixth input pin, respectively, the fifth input pin and the sixth input pin receive the first voltage and the second voltage with different levels, respectively, to make the third memory slot and the fourth memory slot form two different access addresses, and the third memory slot and the fourth memory slot are not controlled by any of the pin control signals.

11. The motherboard according to claim 1, wherein the bus is a system management bus.

12. An interface control method of a memory slot, adapted for a motherboard including a plurality of slot groups, a bus, and an interface controller, wherein each of the slot groups has a first memory slot and a second memory slot electrically connected with the bus, respectively, the first memory slot has a plurality of first connection pins, and the second memory slot has a plurality of second connection pins, the interface control method of the memory slot comprising:
   receiving a first voltage and a second voltage with different levels via a second input pin of the second connection pins and a first input pin of the first connection pins, respectively, to form two different access addresses;
   transmitting a plurality of pin control signals to the corresponding slot groups via the interface controller to make the two access addresses of the first memory slot and the second memory slot of a using slot group of the slot groups different from the two access addresses of the first memory slot and the second memory slot of each of the other slot groups; and
   accessing the using slot group via the interface controller.

13. The interface control method of the memory slot according to claim 12, wherein each of the first memory slot and the second memory slot includes three connection pins.

14. The interface control method of the memory slot according to claim 12, wherein the first voltage corresponds to logical zero, and the second voltage corresponds to logical one.

15. The interface control method of the memory slot according to claim 12, wherein the first voltage corresponds to logical one, and the second voltage corresponds to logical zero.

16. The interface control method of the memory slot according to claim 12, wherein the first input pin is the least significant bit connection pin of the first connection pins, and the second input pin is the least significant bit connection pin of the second connection pins.

17. The interface control method of the memory slot according to claim 16, wherein the most significant bit connection pins of the first connection pins and the second connection pins are connected with ground voltage, respectively.

18. The interface control method of the memory slot according to claim 12, wherein the pin control signals are outputted via a plurality of general-purpose input/output ports of the interface controller.

19. The interface control method of the memory slot according to claim 12, wherein the pin control signals are outputted to a third input pin of the first connection pins and a fourth input pin of the second connection pins.

20. The interface control method of the memory slot according to claim 12, wherein the number of the pin control signals is the same as the number of the slot groups.

* * * * *